United States Patent

Schlipf et al.

[11] Patent Number: 5,200,442
[45] Date of Patent: Apr. 6, 1993

[54] PROCESS FOR THE PREPARATION OF A CROSSLINKABLE BINDER FOR PAINTS FROM FLUOROPOLYMER SOLUTIONS

[75] Inventors: Michael Schlipf, Burgkirchen; Eduard Weiss, Burghausen, both of Fed. Rep. of Germany

[73] Assignee: Hoechst Aktiengesellschaft, Frankfurt am Main, Fed. Rep. of Germany

[21] Appl. No.: 806,582

[22] Filed: Dec. 12, 1991

[30] Foreign Application Priority Data

Dec. 15, 1990 [DE] Fed. Rep. of Germany ....... 4040129

[51] Int. Cl.$^5$ .............................................. C08K 0/00
[52] U.S. Cl. .................................. 523/340; 524/379; 524/545; 525/60; 525/61; 526/250; 528/497; 528/501
[58] Field of Search ................. 524/545, 379; 525/60, 525/61; 526/250; 523/340; 528/501, 497

[56] References Cited

U.S. PATENT DOCUMENTS 4,584,343 4/1986 Löhr et al. ............................ 525/60

FOREIGN PATENT DOCUMENTS

WO89/04847 6/1989 World Int. Prop. O. .

Primary Examiner—Joseph L. Schofer
Assistant Examiner—J. M. Reddick

[57] ABSTRACT

A process is described for the preparation of a crosslinkable paint binder by working up a solution of a fluorine-containing copolymer composed of copolymerized units of a perfluoroolefin, a vinyl ester of a short-chain, saponifiable carboxylic acid and a vinyl ester of a strongly branched carboxylic acid which resists saponification. In this process, the bulk of the solvent and the residual monomers are first removed by distillation, the residual highly viscous copolymer is then dissolved in a mixture of alkanol and another solvent which is also capable of dissolving the saponified copolymer to form a homogeneous solution, and the alkaline saponification is subsequently carried out. If desired, the solvent is removed and exchanged for a paint solvent and this solution is finally filtered. A mild saponification is achieved in this manner.

6 Claims, No Drawings

PROCESS FOR THE PREPARATION OF A CROSSLINKABLE BINDER FOR PAINTS FROM FLUOROPOLYMER SOLUTIONS

DESCRIPTION

The invention relates to a process for the preparation of a crosslinkable paint binder by working up a solution of a fluorine-containing copolymer composed of copolymerized units of a perfluoroolefin, a vinyl ester of a short-chain, saponifiable carboxylic acid and a vinyl ester of a strongly branched carboxylic acid which resists saponification.

U.S. Pat. No. 4,584,343 discloses the preparation of fluorine-containing copolymers which are suitable for use as paint binders and which contain, in addition to a fluoroolefin, a vinyl ester of a short-chain, saponifiable carboxylic acid and a vinyl ester of a strongly branched carboxylic acid which is virtually unsaponifiable. Copolymers of this type can be prepared in aqueous phase as colloidal dispersions by the emulsion polymerization process and as suspension polymers which are deposited during the polymerization as a coarse granule product. This publication also states that it is possible for copolymerization to take place in organic solvents having only slight telogenic activity. This publication further states that the copolymer, precipitated from the aqueous phase and subsequently dried, can be saponified by being dissolved in a short-chain alkanol in the presence of strong bases and then precipitated with water. Saponification in aqueous alkalis is also possible. However, this heterogeneous reaction is difficult to handle and requires long reaction times. In particular, if complete saponification is to be attained, very long periods and the use of large amounts of strong alkalis are necessary. This runs the risk that even the unsaponifiable vinyl ester will to a small extent be attacked and dehydrofluorination of the polymeric chain will occur; this is undesirable, since it may introduce impurities and will impair the copolymer. Accordingly, the object was to seek a more straightforward process for saponifying the ester groups readily available for this reaction.

The object is achieved according to the invention by a process of the type defined at the outset, wherein a) the bulk of the solvent is first removed by distillation under atmospheric pressure, b) the residual monomers are then removed by vacuum distillation coupled with a forced transfer of the highly viscous copolymer, c) this highly viscous copolymer is dissolved in a mixture of an alkanol having 1 to 4 carbon atoms and a solvent, this mixture also being capable of dissolving the saponified product to form a homogeneous solution, and d) the saponification is carried out by the addition of an alkaline agent, the solvent from c) is removed by distillation, if desired, and the remaining highly viscous copolymer is dissolved in a paint solvent, and e) the resultant solution of the copolymer is filtered.

The fluorine-containing copolymers suitable for working up by the process according to the invention are those which contain $\alpha$) copolymerized units of a perfluoroolefin, in particular of one having 2 to 10 carbon atoms, which has a terminal double bond and can be straight-chained or branched, for example perfluoro-1-butene, perfluoro-1-octene, perfluoro-1-hexene and perfluoroisobutylene and preferably hexafluoropropylene and tetrafluoroethylene (TFE). They further contain $\beta$) copolymerized units of a vinyl ester of a short-chain, saponifiable carboxylic acid, particularly a carboxylic acid whose acyl radical has 2 to 4 carbon atoms, such as, above all, vinyl propionate and in particular vinyl acetate. Finally, they contain $\gamma$) copolymerized units of a vinyl ester of a strongly branched carboxylic acid which resists saponification. These are vinyl esters of the formula

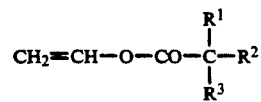

in which $R^1$, $R^2$ or $R^3$ are branched or straight-chain alkyl radicals and the total acyl radical has 9 to 11 carbon atoms, with the proviso that not more than one of these radicals $R^1$, $R^2$ and $R^3$ can be hydrogen. Preferred branched acyl radicals of the above formula are those which have 9 carbon atoms and are composed of isomers which have, in addition to the one quaternary carbon atom, a second quaternary carbon atom or even 1 to 2 tertiary carbon atoms in the same radical. In these copolymers, the vinyl esters of the compound $\gamma$) are present in an amount from 20 to 80 mol %, the vinyl esters of the component $\beta$) in an amount from 5 to 50 mol % and the fluoroalkenes of the component $\alpha$) in an amount that makes up the sum of the components $\alpha)+\beta)+\gamma)$ to 100 mol %, but with the proviso that at least 10 mol % of the fluoroalkene units are present in the copolymer. The amount of $\gamma$) is preferably 10 to 60 mol %, the amount of $\beta$) 20 to 50 $\alpha$) being again present in an amount that makes up the sum $\alpha)+\beta)+\gamma)$ to 100 mol %, with the proviso that $\alpha$) is at least 10 mol %, preferably at least 25 mol %.

The copolymerization to prepare the above copolymers is carried out in organic solvents which dissolve the copolymer formed. Suitable solvents for this purpose are particularly perfluorinated solvents or solvents perhalogenated or partially halogenated with fluorine and chlorine, for example 1,1,2-trichloro-1,2,2-trifluoroethane, perfluorocyclobutane, perfluoro-n-pentane, perfluoroisopentane, perfluoro-n-hexane, perfluoroisohexane, 1,1,1,2-tetrafluoroethane or 1,1,2,2-tetrafluoroethane. Other suitable solvents are alkanols, such as tert.-butanol, carboxylic acid esters, for example butyl acetate or n-propyl acetate, or aliphatic or cycloaliphatic ketones, for example methyl isobutyl ketone or cyclohexanone, as well as alkylaromatic compounds, for example toluene or xylene, or mixtures of the above solvents with each other or with ethanol.

The copolymerization is carried out in the presence of suitable free radical-forming initiators, suitable initiators for this purpose being either a hard, energy-rich radiation or initiators such as fluoroacyl peroxides or peroxy-dicarbonates. Furthermore, chain transfer agents used for regulating the molecular weight can be present.

By this process, the above copolymers are obtained in the form of clear, low-viscosity solutions which usually contain 5 to 30% by weight of the copolymer. The process for working up these solutions for the purpose of obtaining a crosslinkable paint binder, the object of this invention, first requires the separation of the residual monomers, i.e. the saponifiable and the unsaponifiable vinyl ester. Since the saponifiable vinyl ester in the case of low-boiling solvents and the unsaponifiable vinyl ester in all cases boil above the boiling point of the solvent in question, these solvents must be removed first. If a high-boiling solvent is present, the saponifiable vinyl ester is also removed at the same time. This is carried out by distillation at atmospheric pressure in equipment such as thin-film, falling-film, rotary or short-path evaporators.

The distillative separation of the residual monomers, i.e. the unsaponifiable and, if appropriate, the saponifiable vinyl ester, is carried out by vacuum distillation, for example via thin-film evaporators, short-path evaporators, rotary evaporators and filmtruders. For this working-up stage only that equipment is suitable in which a forced transfer of the resultant highly viscous product is possible.

If desired, it is possible, prior to working-up, to add flow assistants which are not completely removed from the product under the working-up conditions used and thus lead to a reduction in viscosity. Also, the addition of these flow assistants results in an improved separation of the residual monomers, which in turn leads to a lower iodine color value of the resultant paint binder. In general, in the case of a paint binder, an as low iodine color value as possible is to be aimed at in order not to lower the weathering stability, to make preparation of clear varnishes possible and not to alter the pigment color hue of pigmented coating systems.

Suitable flow assistants are solvents which remain unchanged in the alkaline pH range and which, provided that they are present in a low concentration only, do not adversely affect the characteristic profile of the resultant paint binder. Suitable examples are alkyl-substituted aromatic hydrocarbons, such as toluene, xylenes or mesitylenes or alkyl aromatic cuts, such as those offered by Esso-Chemie under the designations Solvesso ® 100, Solvesso ® 150 or Solvesso ® 200.

This vacuum distillation can expediently be pursued to an as complete removal of the residual monomers as possible as extractive distillation. To this end organic solvents or solvent mixtures which, for example, form azeotropic mixtures with the above residual monomers and thus contribute to a better separation, are additionally fed into the evaporator during distillation. The same solvents which are also suitable as flow assistants, in particular, can be used as extractants. The extractive distillation can be carried out with a continuous feed of the extractant, and the extractant can have a boiling point of up to 185° C.

After the above residual monomers have been removed by distillation, the product which is highly viscous at an elevated temperature and a solid at room temperature, is dissolved in a solvent mixture which is suitable for the subsequent saponification of the saponifiable vinyl ester. It is essential to choose a solvent mixture in which both the unsaponified and the saponified product are soluble in a copolymer concentration which is adequate for the saponification, to form a homogeneous solution and in this way the saponified product is retained in solution. Within the scope of this description, the term "saponification" is intended to be understood as ester cleavage both by hydrolysis and by alcoholysis.

The composition of the solvent mixture will depend on the composition of the fluorocopolymer to be dissolved. However, 10 to 60% by volume, preferably 10 to 50% by volume, of the solvent mixture must be present as an alkanol having 1 to 4 carbon atoms, preferably methanol. This alkanol acts not only as solvent, but is also required for the saponification reaction. The other component (40 to 90% by volume) can be a pure solvent or likewise a mixture. Suitable solvents are preferably the following groups: perfluorinated cycloalkanes having 4 to 6 carbon atoms, for example perfluorocyclobutane; perfluorinated alkanes having 2 to 12 carbon atoms, preferably 2 to 6 carbon atoms, or such alkanes fully or partially substituted with fluorine and chlorine, for example 1,1,2-trichloro-1,2,2-trifluoroethane,perfluoro-n-pentane, perfluoroisopentane, perfluoro-n-hexane, perfluoroisohexane, 1,1,1,2-tetrafluoroethane or 1,1,2,2-tetrafluoroethane, aliphatic ketones having 3 to 11 carbon atoms, preferably 3 to 7 carbon atoms, for example methyl ethyl ketone or methyl isobutyl ketone; alkyl-substituted benzenes, for example toluene, xylene, mesitylene or ethylbenzene, these compounds containing 1 to 6 alkyl chains having 1 to 3 carbon atoms per alkyl group; finally also perfluorinated ethers which represent oligomers of tetrafluoroethylene oxide or hexafluoropropylene oxide or mixtures of both these oxides. If desired, these solvents can also be returned to the process in stage c) after any residual monomers which may be present, have been removed in stages a) and b).

Saponification is carried out by the addition of an alkaline agent, in particular an alkali metal hydroxide such as sodium or potassium hydroxide, added in the form of a concentrated aqueous solution, or by the addition of an alkali metal alkoxide, for example sodium methylate, added in concentrated solution in the corresponding alcohol. The temperature of the reaction medium should expediently be 15° to 50° C. In the case of low-boiling solvents, increased pressure can be employed, if desired.

If 4 to 20 mol % of sodium hydroxide, based on the amount of the saponifiable vinyl ester in the polymer, is added, saponification is terminated at a reaction temperature of 20° C. after 5 to 20 hours. Monitoring the conversion of the components of the saponifiable vinyl ester in the polymer into vinyl alcohol components is carried out by IR spectroscopy.

Under the reaction conditions specified as an example, it is possible to convert the units of the vinyl ester of the component β) into OH groups in an amount from 50 to 100%, preferably from 50 to 80%.

Saponification in accordance with the conditions of the process according to the invention in which both the unsaponified and the saponified fluorocopolymers are soluble in the solvent or solvent mixture used for the saponification to form a homogeneous solution, results in two advantages which are essential for the preparation of the binder of a coating system with a high weathering resistance:

On the one hand, sufficiently mild saponification conditions can be employed to enable extensive saponification to occur without impairing the remaining polymer chain, as manifested for example by a brown coloration due to dehydrohalogenation at the tetrafluoroethylene/vinyl ester links in the polymeric chain, but at the same time definitely rule out an attack on the units of the unsaponifiable vinyl ester. On the other hand, the units of the saponifiable vinyl ester present in solution are much more readily accessible to saponification than they would be in a heterogeneous phase, and allow the preparation of a polymer which has an adequate number of functional OH groups available for subsequent curing by chemical crosslinking, to take place.

Vinyl ester units which are not saponified under homogeneous saponification conditions and in the given amounts of bases, are not available for saponification in the cured coating system and thus do not impair the high weathering resistance of the fluorine-containing coating system.

The saponification reaction is terminated by neutralizing the unconsumed base by the addition of an acid, for example acetic acid. The solvent mixture required for the saponification may also be suitable for the use of the product as paint binder. If appropriate, however, the separation of the solvent phase of the saponification stage c) and the subsequent redissolution in a paint solvent is expedient.

The removal of the solvent mixture required for the saponification is carried out by distillation under atmospheric pressure. A thin-film evaporator is preferably suitable for this purpose or a falling-film or short-path evaporator, depending on the viscosity of the resultant binder resin.

After this removal the highly viscous resin is transferred to a stirring or mixing installation, where it is dissolved in a solvent which is suitable for use as paint binder an is conventionally used in the paint industry. Such solvents are chosen above all from the following groups: aliphatic alcohols having 1 to 8 carbon atoms, in particular having 4 to 8 carbon atoms; polyglycols such as ethylene diglycol, ethylene triglycol, propylene diglycol, propylene triglycol; monoethers and diethers of such glycols, for example ethylene glycol monoethyl ether, ethylene glycol diethyl ether, ethylene glycol monobutyl ether, ethylene glycol dibutyl ether, propylene glycol monomethyl ether; glycol esters or glycol ether esters, for example ethylene glycol acetate or ethylene glycol acetate ethyl ether, propylene glycol acetate ethyl ether and propylene glycol acetate methyl ether; furthermore alkylated and dialkylated aromatic compounds, for example xylene and diethylbenzene as well as isomeric mixtures of alkylated aromatic compounds, such as those marketed under the names Solvesso ® or Shellsol ®; ketones, for example methyl isobutyl ketone, cyclohexanone and isophorone; carboxylic acid esters, in particular esters of acetic acid and propionic acid with alcohols having 1 to 6 carbon atoms; finally all mixtures of such solvents, provided they are miscible with each other to form a homogeneous solution. The mixing ratio of dissolved copolymers to solvent can be from 95:5 to 5:95, preferably from 90:10 to 10:90, i.e. paint systems with high proportions of binder resin ("high solids") can also be prepared.

The solution is then filtered to remove salts which form, for example, in the neutralization of bases with acetic acid, and insoluble polymer particles. To increase the performance of the filter, the filtration is preferably performed under increased pressure, pressures between 1 bar and 25 bar being customary, and at an elevated temperature which, however, must be below the boiling point of the solvent. Both monolayer and multilayer filters are suitable as filtration equipment. They should preferably be capable of operating under increased pressure and at elevated temperatures. Filter layers, in particular deep-filter layers and membrane filters, are suitable as the filter medium.

Examples of suitable filter media are the filter layers from Seitz, Bad Kreuznach, Germany, available on the market under the brand name Seitz Supra ®.

Only those materials are suitable for the filter media which are neither soluble in the solvent or solvent mixtures used nor exhibit pronounced swelling characteristics.

To increase the performance of the filter it is useful to carry out the filtration in several stages, the pore size of the filter media used being reduced from stage to stage.

A coating system of high weathering resistance can be prepared from the paint binder prepared by the process according to the invention, in that pigments customary for paint formulation, for example titanium dioxide, and other additives, for example flow control agents, are incorporated, as far as necessary, in a first step.

If the paint binder is employed to prepare a heat-curing paint, crosslinking agents suitable for this purpose, for example melamine resins or blocked polyisocyanates, are then admixed, these mixtures representing one-component coating systems.

If on the other hand the copolymer is used for the preparation of a paint which is to be curable even at room temperature, a non-blocked polyisocyanate is used as crosslinking agent. In this application the curing agent is admixed separately prior to use, and a two-component coating system is used.

The advantages of the process according to the invention lie in the fact that under the mild reaction conditions which rule out any impairment of the polymer, it is possible to prepare fluorine-containing copolymers which contain a sufficient number of OH groups and which, after curing by chemical crosslinking, are suitable for the preparation of coatings of high weathering resistance.

The invention is elucidated by the following examples:

EXAMPLE 1

A fluorine-containing copolymer is used for the working-up which has been obtained by copolymerization of TFE, of a vinyl ester of a highly branched carboxylic acid having an acyl radical of 9 carbon atoms (an isomeric mixture being present in the acyl radical, comprising 28 mol % of carbon chains having two quaternary carbon atoms; 68 mol % of carbon chains having one quaternary and two tertiary carbon atoms; 4 mol % of carbon chains having one quaternary and one tertiary carbon atom) and of vinyl acetate in 1,1,2-trichloro-1,2,2-trifluoroethane. It is in the form of a clear copolymer solution having a solids content of 17%. The residual monomer content is 1.9% of a strongly branched vinyl ester and 1.0% of vinyl acetate. The separation of 1,1,2-trichloro-1,2,2-trifluoroethane with the predominant proportion of vinyl acetate is carried out by distillation under atmospheric pressure as the first step. The thin-layer evaporator temperature is 130° C., and at an evaporator area of 0.1 m² a throughput of 9 kg of polymerization liquor per hour can be achieved. In the second step (vacuum distillation) the evaporator temperature is 150° C. at a vacuum of 170 mbar. At an evaporator area of 0.1 m² the throughput is 2.5 kg of product per hour. The polymer procured in this way is colorless to faintly yellowish. It contains 37 mol % of copolymerized TFE units, 31 mol % of copolymerized units of the abovementioned strongly branched vinyl ester and 32 mol % of copolymerized units of vinyl acetate. For the saponification, 1 kg of the copolymer is dissolved in a mixture of 1650 ml of 1,1,2-trichloro-1,2,2-trifluoroethane and 550 ml of methanol. After the addition of the appropriate molar amount of NaOH, based on the vinyl acetate proportion of the copolymer as stated in Table 1 below, the saponification is carried out at room temperature for 5 hours with constant stirring. The control of the degree of saponification (Table 1) is carried out by IR spectroscopy by measuring the OH band at 3500 cm$^{-1}$. After the reaction, the pH of the reaction solution is adjusted to 6-7 by the addition of acetic acid. The solvent mixture required for the saponification is removed with the aid of a thin-layer evaporator and the product is dissolved in butyl acetate. Salts present as an impurity, for example sodium acetate, are separated by a final pressure filtration, a clear, colorless to faintly yellow product being obtained. It has an OH value of 115. Its inherent viscosity $\eta$, measured at 25° C. in tetrahydrofuran, is 0.22 dl/g. Molecular weight determination by gel permeation chromatography (GPC) in tetrahydrofuran as relative measurement, based on a polystyrene standard, gave a value of $\overline{M}_{rel}=54,300$.

Determination of the viscosity of the 50% solution was carried out, as is conventional with paints, using a 4 mm flow cup according to DIN 53 211; in butyl acetate as solvent the value was 53 seconds.

TABLE 1

| NaOH* (as a 10 molar solution) | Degree of saponification (based on vinyl acetate) | OH value | Saponification time |
|---|---|---|---|
| 10 mol % | 77% | 127 | 5 hours |
| 8 mol % | 76% | 125 | 5 hours |
| 6 mol % | 72% | 119 | 5 hours |
| 4 mol % | 48% | 79 | 5 hours |

*based on the proportion of vinyl acetate in the polymer

EXAMPLE 2

The procedure of Example 1 is modified in that the saponification of the same copolymer solution is carried out with a uniform amount of 4 mol % NaOH, based on vinyl acetate, but over differing periods of time. The degrees of saponification achieved are listed in Table 2.

TABLE 2

| NaOH* (as a 10 molar solution) | Degree of saponification (based on vinyl acetate) | OH value | Saponification time |
|---|---|---|---|
| 4 mol % | 48% | 79 | 5 hours |
| 4 mol % | 51% | 84 | 8 hours |
| 4 mol % | 65% | 107 | 16 hours |
| 4 mol % | 70% | 116 | 22 hours |

*based on the proportion of vinyl acetate in the polymer

EXAMPLE 3

The procedure of Example 1 is followed. Working-up furnishes a copolymer which contains 42.6 mol % of copolymerized TFE units, 35.9 mol % of copolymerized units of the strongly branched vinyl ester from Example 1 and 21.5 mol % of copolymerized vinyl acetate units.

To saponify 1 kg of the copolymer, a mixture of 400 ml of methanol and 1900 ml of 1,1,2-trichloro-1,2,2-trifluoroethane is added. In the saponification with 8.mol % of NaOH, based on the proportionate amount of vinyl acetate, a degree of saponification of 61% is achieved in the course of 7 hours (OH value 62).

EXAMPLE 4

The working-up is carried out as described in Example 1, but after separation of the residual monomers a faintly yellow product is obtained which contains 43 mol % of copolymerized TFE units, 36 mol % of copolymerized units of a vinyl ester of a strongly branched carboxylic acid having an acyl radical of 9 carbon atoms (an isomeric mixture being present in the acyl radical, comprising 28 mol % of carbon chains having two quaternary carbon atoms; 68 mol % of carbon chains having one quaternary and two tertiary carbon atoms; 4 mol % of carbon chains having one quaternary and one tertiary carbon atom) and 21 mol % of copolymerized units of vinyl acetate.

For the saponification, 1 kg of the copolymer is dissolved in a mixture of 1800 ml of 1,1,2-trichloro-1,2,2-trifluoroethane and 550 ml of methanol. After the addition of 10 mol % of NaOH, based on the amount of vinyl acetate contained in the copolymer, the saponification is carried out at room temperature over 5 hours with constant stirring. The control of the degree of saponification is carried out by IR spectroscopy by measuring the OH band at 3500 cm$^{-1}$. After the reaction, the pH of the reaction solution is adjusted to 6-7 by the addition of acetic acid. The solvent mixture required for the saponification is removed with the aid of a thin-layer evaporator and the product is dissolved in xylene. Salts containing impurities, for example sodium acetate, are separated by a final pressure filtration, a clear, colorless to light yellow product being obtained. It has an OH value of 70, corresponding to a degree of saponification of 61%. Its inherent viscosity $\eta$, measured at 25° C. in tetrahydrofuran, is 0.26 dl/g. Molecular weight determination by GPC in tetrahydrofuran as relative measurement, based on a polystyrene standard, gave a value of $\overline{M}_{rel}=61,000$.

EXAMPLE 5

For the working-up, a fluorine-containing copolymer is used which has been obtained by copolymerization of TFE with a strongly branched vinyl ester [the acyl radical representing a mixture of essentially an acyl component in which $R^1$ is $CH_3$, $R^2$ is $C_2H_5$, $R^3$ is $CH_3(CH_2)_4$— and a further acyl component in which $R^1$ is $CH_3$, $R^2$ is $CH_3$, $R^3$ is $CH_3(CH_2)_5$—] and with vinyl acetate in a mixture of 80% by volume of 1,1,2-trichloro-1,2,2-trifluoroethane and 20% by volume of xylene. It is present as a clear copolymer solution having a solids content of 18%. The residual monomer content is 1.5% of the abovementioned strongly branched vinyl ester and 0.8% of vinyl acetate. To separate the polymerization liquor and residual monomers, the solution of the product is subjected to a distillation. The separation of 1,1,2-trichloro-1,2,2-trifluoroethane and the predominant amount of vinyl acetate is carried out by distillation under atmospheric pressure as the first step. The temperature of the thin-film evaporator is 130° C. and at an evaporator area of 0.1 m$^2$ a throughput of 8 kg of polymerization liquor per hour can be achieved. In the second step (vacuum distillation) the evaporator temperature is 150° C. at a vacuum of 125 mbar. At an evaporator area of 0.1 m$^2$, the throughput is 2.4 kg of product per hour.

The polymer obtained in this way is faintly yellow. It comprises 42 mol % of TFE units, 33 mol % of the above-mentioned strongly branched vinyl ester and 25 mol % of vinyl acetate.

For the saponification, 1 kg of the copolymer is dissolved in a mixture of 1650 ml of 1,1,2-trichloro-1,2,2-trifluoroethane and 550 ml of methanol. After the addition of 10 mol % of NaOH, based on the proportion of vinyl acetate present in the copolymer, saponification is carried out at room temperature over 5 hours with constant stirring. The control of the degree of saponification is carried out by IR spectroscopy by measuring the OH band at 3500 cm$^{-1}$. After the reaction, the pH of the reaction solution is adjusted to 6.5 by the addition of acetic acid. The solvent mixture required for the saponification is removed with the aid of a thin-layer evaporator and the product is dissolved in xylene. Salts present as impurities, for example sodium acetate, are separated by a final pressure filtration, a clear light-yellow product being obtained. Determination of the OH value is carried out by reaction of the polymer with acetic anhydride, followed by neutralization of the liberated acetic acid with potassium hydroxide. The product has an OH value of 87, corresponding to a degree of saponification of 55%. Its inherent viscosity $\eta$, measured at 25° C. in tetrahydrofuran, is 0.07 dl/g. Molecular weight determination by GPC in tetrahydrofuran as relative measurement, based on a polystyrene standard, gave a value of $\overline{M}_{rel}=20,600$.

Determination of the viscosity of the 50% solution was carried out, as is customary with paints, using a 4 mm flow cup according to DIN 53 211 and gave a value of 47 seconds.

We claim:

1. A process for the preparation of a crosslinkable paint binder, which comprises
    a) distilling under atmospheric pressure a solution of a fluorine-containing copolymer comprising copolymerized units from
        1) a perfluoroolefin,
        2) a saponifiable vinyl ester of a short-chain
        3) a vinyl ester of a highly branched carboxylic acid which resists saponification,
    b) subjecting the distillation residue from step a) to vacuum distillation coupled with a forced transfer of the so-obtained highly viscous copolymer,
    c) dissolving the so-obtained highly viscous copolymer in a mixture of an alkanol having 1 to 4 carbon atoms and a second solvent, this mixture also being capable of dissolving the saponified product from step d), below, to form a homogeneous solution,
    d) saponifying the saponifiable groups of said copolymerized units 2), by the addition of an alkaline agent, and
    e) filtering the resulting solution of the copolymer.

2. The process as claimed in claim 1, wherein step b) a flow assistant is added which remains, at least in part, in the copolymer under the conditions used in the said vacuum distillation.

3. The process as claimed in claim 2, wherein the flow assistant is an alkyl-substituted aromatic hydrocarbon.

4. The process as claimed in claim 1, wherein the vacuum distillation according to step b) is performed as an extractive distillation with a continuous feed of an extractant which has a boiling point up to 185° C.

5. The process as claimed in claim 1, wherein in stage c) the highly viscous copolymer is dissolved in a mixture of 10 to 60% by volume of an alkanol having 1 to 4 carbon atoms and 40 to 90% by volume of said second solvent, which solvent is selected from the group consisting of perfluorinated cycloalkanes having 4 to 6 carbon atoms; perfluorinated alkanes having 2 to 12 carbon atoms; alkanes fully or partially substituted with fluorine and chlorine, having 2 to 12 carbon atoms; aliphatic ketones having 3 to 11 carbon atoms; benzenes having 1 to 6 alkyl groups, each having 1 to 3 carbon atoms; perfluorinated ethers which represent oligomers of tetrafluoroethylene oxide or hexafluoropropylene oxide or mixtures of these ethers; and a mixture of such solvents.

6. A process for the preparation of a crosslinkable paint binder, which comprises
    a) distilling under atmospheric pressure a solution of a fluorine-containing copolymer comprising copolymerized units from at least the following monomers: 1) a perfluoroolefin, 2) a saponifiable vinyl ester of a short-chain carboxylic acid, and 3) a vinyl ester of a branched carboxylic acid which is sufficiently branched to impart to this ester a resistance to saponification,
    b) subjecting the distillation residue from step a) to vacuum distillation coupled with a forced transfer of the so-obtained highly viscous copolymer,
    c) dissolving the so-obtained highly viscous copolymer in a mixture comprising an alkanol having 1 to 4 carbon atoms and a nonalcoholic solvent, this mixture also being capable of dissolving any saponified copolymer which can be obtained by saponifying copolymerized units obtained from said monomer 2), to form a homogeneous solution,
    d) saponifying the saponifiable groups of the copolymerized units obtained from said monomer 2), by the addition of an alkaline agent, removing the solvent mixture from step c) and adding a paint solvent, and
    e) filtering the resulting solution of the copolymer.

* * * * *

UNITED STATES PATENT AND TRADEMARK OFFICE
CERTIFICATE OF CORRECTION

PATENT NO. : 5,200,442
DATED : April 6, 1993
INVENTOR(S) : Michael Schlipf, et al It is certified that error appears in the above-indentified patent and that said Letters Patent is hereby corrected as shown below: On the title page, item [56] References Cited:

The References Cited should include the following U.S. patent documents:

| | | |
|---|---|---|
| 4,985,519 | 1/1991 | Koishi, et al |
| 5,079,320 | 1/1992 | Kappler, et al |

In claim 1, at column 9, line 38, after "short-chain" insert --carboxylic acid, and--.

In claim 2, at column 10, line 1, after "wherein" insert --in--.

In claim 6, at column 10, line 48, after "agent" insert --d')--.

Signed and Sealed this

Seventeenth Day of May, 1994

Attest:

BRUCE LEHMAN

*Attesting Officer*    Commissioner of Patents and Trademarks